United States Patent Office 3,476,859
Patented Nov. 4, 1969

3,476,859
PEST CONTROL COMPOSITIONS AND METHOD
Ralph I. Dorfman, Los Altos Hills, Calif., assignor to Syntex Corporation, Panama, Panama, a corporation of Panama
No Drawing. Filed Oct. 27, 1966, Ser. No. 589,856
Int. Cl. A01n 9/00
U.S. Cl. 424—317                           6 Claims

ABSTRACT OF THE DISCLOSURE

The control of rodents and birds by administering an edible composition containing a pest management chemical selected from 1,2,3,4-tetrahydrophenanthrene-, 1,2,3,-4,9,10 - hexahydrophenanthrene- and 1,2,3,4,9,10,11,12-octahydrophenanthrene acids, alcohols and aldehydes and derivatives thereof to minimize or terminate the reproductive capabilities of said rodents or birds.

---

This invention relates to a novel method and compositions for the control of pests. More particularly, the present invention relates to a novel method for the control of pests which comprises making available to said pests in their habitat an edible composition containing, as the essential active ingredient, a pest management chemical represented by the following formulas:

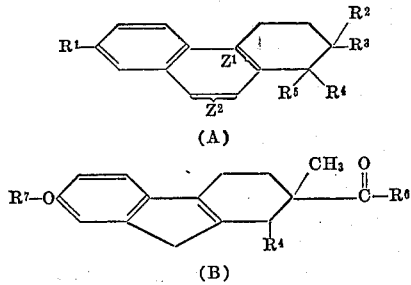

(A)

(B)

wherein
$R^1$ is hydrogen, hydroxy, allyloxy, diethylaminoethoxy, lower alkoxy containing one to four carbon atoms, cyclopentyloxy, tetrahydrofuran-2'-yloxy or tetrahydropyran-2'-yloxy;
$R^2$ is hydrogen, methyl, ethyl or n-propyl;
$R^3$ is carboxy, carboalkoxy containing two to five carbon atoms, cyano, amido, carbothiomethyl, acetyl, formyl, methylol,

acetoxymethyl, methyl or ethyl;
$R^4$ is methyl or ethyl;
$R^5$ is hydrogen, methyl or ethyl;
$R^6$ is hydroxy, methoxy or fluoro;
$R^7$ is hydrogen or methyl; and
each of $Z^1$ and $Z^2$ is a carbon-carbon single bond or a carbon-carbon double bond, $Z^2$ being a single bond when $Z^1$ is a single bond.

The term "pest," as used herein and in the claims, is understood to refer to undesirable rodents and birds which are economically and socially destructive to man. More specifically, the term "pest" refers to undesirable rodents such as rats, mice, ground squirrels, prairie dogs, pocket gophers, rabbits, nutria, and the like, and undesirable birds, such as pigeons, starlings, blackbirds, grackles, cowbirds, crows, and the like.

Pests, e.g. rodents and particularly rats, are responsible for extensive and serious damage to man's well-being. They are known to consume and contaminate food supplies and to destroy grain fields. In addition, they are known to carry and transmit diseases, to create social nuisances, and to cause damage to buildings. In the United States alone, it is a well-known fact that the annual damage caused by pests results in a loss of hundreds of millions of dollars. It is clear, therefore, that the improvement of the present invention for the control of pests is a welcomed contribution.

Heretofore, several chemical and physical methods have been used in an effort to control pests. The prior-art methods generally involve such methods as electrocution, the ingestion of rodenticide baits, and the administration of toxic gases. A primary disadvantage of prior art methods of pest control is that they are effective for only a short period of time. For example, within two to four months after treatment in a particular area by prior-art methods, the number of pests within the treated area returns to the level existing before treatment. Such recovery and comeback of pests has been observed to take place even though 95–100 percent of the pests had been eliminated. Another disadvantage of prior-art methods is that their use is sometimes dangerous to domestic animals and humans within the tested area. Another disadvantage of prior-art methods is the development of "bait shyness" by the pests. Bait shyness is the aversion to bait exhibited by pests after witnessing the death of a few pests who initially test the bait. Another disadvantage of prior-art methods is that only those pests which come in direct contact with the bait or mechanical devices are affected.

A primary object of the present invention is to provide a method and a composition for the control of pests which overcome the aforementioned disadvantages. Another object of the present invention is to provide a method and composition for the control of pests which is characterized by ease and simplicity of application but yet is highly effective. Another object of the present invention is to provide a method and composition for control of pests which is not limited in its effectiveness to direct contact. Other objects and advantages of the present invention will become apparent as the invention is hereinafter described in detail and from the claims.

It has now been found in accordance with the present invention that the control of pests, e.g. undesirable rodents and birds, can be simply but yet effectively achieved by making available to said pests in their habitat an edible composition containing, as the essential active ingredient, a pest management chemical represented by Formulas A and B above.

The preferred pest management chemicals, for the practice of the present invention, are those of Formula A having the following more specific Formulas C, D and E.

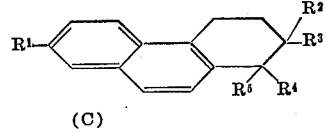

(C)

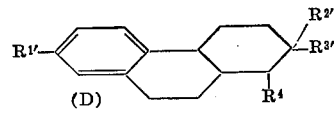

(D)

wherein $R^{1\prime}$ is hydroxy or methoxy; $R^{2\prime}$ is hydrogen or methyl; $R^{3\prime}$ is carboxy, formyl, methylol or

and $R^1$, $R^2$, $R^3$, $R^4$, $R^5$ and $R^6$ are as defined hereinabove.

The compounds of Formulas A and B, wherein each of $Z^1$ and $Z^2$ are carbon-carbon double bonds or wherein $Z^1$ is a carbon-carbon double bond and $Z^2$ is a carbon-carbon single bond, each possesses two centers of asymmetry and can exist in two dl forms, e.g. l-cis, d-cis, 1- trans and d-trans. In addition, two racemates are possible, e.g. dl-cis and dl-trans. Of the two racemates, the dl-cis racemate is preferred for the process of the present invention. The compounds of Formula A, wherein each of $Z^1$ and $Z^2$ is a carbon-carbon single bond, each possesses three centers of asymmetry. The configuration, e.g. the relationship of the $R^3$ and $R^4$ substituents, of Formula A, are dl-trans and dl-cis, respectively. All compounds of the above formulas may be used alone or combined in mixtures thereof for the practice of the present invention.

Representative specific pest control and management chemicals that can be employed according to the present invention include:

racemic-cis 1-ethyl - 2 - methyl - 7 - ethoxy-1,2,3,4-tetrathrenecarboxylic acid;
d-cis bisdehydrodoisynolic acid and the 7-methyl ether;
l-cis bisdehydrodoisynolic acid and the 7-methyl ether;
d-trans bisdehydrodoisynolic acid;
racemic-cis bisdehydrodoisynolic acid;
racemic-cis 1-ethyl-2-methyl - 7 - ethoxy - 1,2,3,4 - tetrahydro-2-phenanthrenecarboxylic acid methyl ester;
racemic-cis 1-ethyl - 2 - methyl - 7 - ethoxy-1,2,3,4-tetrahydro-2-phenanthrenecarboxylic acid;
racemic-cis 1-ethyl-2-methyl-7-methoxy - 1,2,3,4 - tetrahydro-2-phenanthrenecarboxylic acid ethyl ester;
racemic-cis 1-ethyl-2-methyl-7-methoxy - 1,2,3,4 - tetrahydro-2-phenanthrenecarboxylic acid n-propyl ester;
racemic-cis 1-ethyl-2-methyl-7-methoxy - 1,2,3,4 - tetrahydro-2-phenanthrenecarboxylic acid n-butyl ester;
racemic-cis 1-ethyl-2-methyl-7-allyloxy - 1,2,3,4 - tetrahydro-2-phenanthrenecarboxylic acid;
racemic-cis 1-ethyl-2-methyl-7-n-propoxy - 1,2,3,4 - tetrahydro-2-phenanthrenecarboxylic acid;
racemic-cis 1-ethyl-2-methyl-7-n-butoxy - 1,2,3,4 - tetrahydro-2-phenanthrenecarboxylic acid;
racemic-cis 1-ethyl-2-methyl-7-methoxy - 1,2,3,4 - tetrahydro-2-[carbo(diethylamino)ethoxy]-phenanthrene;
racemic-cis 1-ethyl-2-methyl - 7 - (diethylaminoethoxy)-1,2,3,4-tetrahydro - 2 - [carbo(diethylamino)ethoxy]-phenanthrene;
racemic-cis 1,2-dimethyl-7-hydroxy - 1,2,3,4 - tetrahydro-2-phenanthrenecarboxylic acid;
racemic-cis 1,2-diethyl-7-hydroxy - 1,2,3,4 - tetrahydro-2-phenanthrenecarboxylic acid;
racemic-cis 1-ethyl-2-n-propyl-7-hydroxy - 1,2,3,4 - tetrahydro-2-phenanthrenecarboxylic acid;
racemic-cis 7 - hydroxy - 1,2,3,4 - tetrahydro-2-phenanthrenecarboxylic acid;
racemic-cis 1-methyl-7-hydroxy - 1,2,3,4 - tetrahydro-2-phenanthrenecarboxylic acid;
racemic-cis 1-methyl-7-methoxy - 1,2,3,4 - tetrahydro-2-phenanthrenecarboxylic acid;
racemic-cis 1,2 - dimethyl-1-ethyl-7-methoxy - 1,2,3,4 - tetrahydro-2-phenanthrenecarboxylic acid;
racemic-cis 1,1 - diethyl-2-methyl-7-methoxy-1,2,3,4-tetrahydro-2-phenanthrenecarboxylic acid;
racemic-cis 1-ethyl-2-methyl-2-cyano-7-methoxy - 1,2,3,4-tetrahydrophenanthrene;
racemic-cis 1-ethyl-2-methyl-2-amido-7-methoxy - 1,2,3,4-tetrahydrophenanthrene;
racemic-cis 1-ethyl - 2 - methyl - 2 - carbothiomethyl-7-methoxy-1,2,3,4-tetrahydrophenanthrene;
racemic-cis 1-ethyl-2-methyl-2-acetyl-7-methoxy - 1,2,3,4-tetrahydrophenanthrene;
racemic-cis 1-ethyl-2-methyl-2-formyl - 7 - methoxy-1,2,3,4-tetrahydrophenanthrene;
racemic-cis 1-ethyl-2-methyl-2-methylol-7-methoxy - 1,2,3,4-tetrahydrophenanthrene;
racemic-cis 1-ethyl-2-methyl-2-acetoxymethyl - 7 - methoxy-1,2,3,4-tetrahydrophenanthrene;
racemic-trans 1-ethyl-2-methyl-2-methylol - 7 - methoxy-1,2,3,4-tetrahydrophenanthrene;
racemic-trans 1-ethyl - 2 - methyl - 2 - acetoxymethyl-7-methoxy-1,2,3,4-tetrahydrophenanthrene;
racemic-cis 1-ethyl-2-methyl-2-carboxymethyl-7-methoxy-1,2,3,4-tetrahydrophenanthrene;
racemic-cis 1-ethyl-2-methyl - 2 - $COCH_2OOCCH_3$-7-methoxy-1,2,3,4-tetrahydrophenanthrene;
racemic-cis 1-ethyl - 2,2 - dimethyl - 7 - methoxy - 1,2,3,4-tetrahydrophenanthrene;
racemic-cis 1,2-diethyl-2-methyl-7-methoxy - 1,2,3,4 - tetrahydrophenanthrene;
1-methyl-7-methoxy-1,2,3,4,9,10,11,12-octahydro-2-phenanthrenecarboxylic acid;
1,2-dimethyl-7-methoxy-1,2,3,4,9,10,11,12-octahydro-2-phenanthrenecarboxylic acid;
d-trans 1-ethyl-2-methyl-7-hydroxy-1,2,3,4,9,10,11,12-octahydro-2-phenanthrenecarboxylic acid;
d-cis 1-ethyl-2-methyl-7-hydroxy-1,2,3,4,9,10,11,12-octahydro-2-phenanthrenecarboxylic acid;
dl-trans 1-ethyl-2-methyl-7-methoxy-1,2,3,4,9,10,11,12-octahydro-2-phenanthrenecarboxylic acid;
dl-cis 1-ethyl-2-methyl-7-hydroxy-1,2,3,4,9,10,11,12-octahydro-2-phenanthrenecarboxylic acid;
dl-cis 1-ethyl-2-methyl-7-methoxy-1,2,3,4,9,10,11,12-octahydro-2-phenanthrenecarboxylic acid;
dl-cis 1-ethyl-2-methyl-7-methoxy-1,2,3,4,9,10,11,12-octahydro-2-phenanthrenecarboxylic acid;
dl-trans 1-ethyl-2-methyl-7-methoxy-1,2,3,4,9,10,11,12-octahydro-2-phenanthrenecarboxylic acid;
1-ethyl-2-methyl-2-formyl-7-methoxy-1,2,3,4,9,10,11,12-octahydrophenanthrene;
1-ethyl-2-methyl-2-methylol-7-methoxy-1,2,3,4,9,10,11,12-octahydrophenanthrene;
1-ethyl-2-methyl-2-methylol-7-hydroxy-1,2,3,4,9,10,11,12-octahydrophenanthrene;
1,2-dimethyl-7-methoxy-1,2,3,4-tetrahydro-2-fluorenecarboxylic acid;
1-ethyl-2-methyl-7-hydroxy-1,2,3,4-tetrahydro-2-fluorenecarboxylic acid;
1-ethyl-2-methyl-7-methoxy-1,2,3,4-tetrahydro-2-fluorenecarboxylic acid;
1-ethyl-2-methyl-7-methoxy-1,2,3,4-tetrahydro-2-carbomethoxyfluorene;
racemic-cis 1-ethyl-2-methyl-7-methoxy-1,2,3,4-tetrahydro-2-phenanthrenecarboxylic acid fluoride;
racemic-cis 1-ethyl-2-methyl-7-n-butoxy-1,2,3,4-tetrahydro-2-phenanthrenecarboxylic acid fluoride;
1-ethyl-2-methyl-7-methoxy-1,2,3,4-tetrahydro-2-fluorenecarboxylic acid fluoride;
racemic-cis 1,2-dimethyl-1-ethyl-7-methoxy-1,2,3,4-tetrahydro-2-phenanthrenecarboxylic acid fluoride;
dl-cis 1-ethyl-2-methyl-7-methoxy-1,2,3,4,9,10,11,12-octahydro-2-phenanthrenecarboxylic acid fluoride;
dl-trans 1-ethyl-2-methyl-7-methoxy-1,2,3,4,9,10,11,12-octahydro-2-phenanthrenecarboxylic acid fluoride.

The preparation of the cyclopentyloxy, tetrahydrofuran - 2' - yloxy and tetrahydropyran - 2' - yloxy compounds of Formula A is described in copending U.S. application of John A. Edwards, Ser. No. 589,494 filed Oct. 26, 1966.

The pest management chemicals of the above formulas for pest control possess certain quotient of oral hormonal activities. Specifically, the pest management chemicals for the practice of the present invention, possess a quotient of from about 2 to about 100, preferably about 15 to about 45, of oral anti-fertility activity to oral estrogenic activity, i.e. the quotient $$\frac{\text{oral anti-fertility activity}}{\text{oral estrogenic activity}}$$

In the quotient, the numerator, i.e. the oral anti-fertility activity, is obtained from the bioassay procedure as described by Kincl, F. A., and Dorfman, R. I., J. Reprod. Fertil., 10, 105–113 (1965). The denominator, i.e. the oral estrogenic activity is obtained from the bioassay procedure as described by Rubin, B. L., Dorfman, A. S., Black, L., and Dorfman, R. I., Endocrinology, 49, 429 (1959). [Dorfman, R. I., and Kincl, F. A., Acta Endocrinologica, 52, 619–626 (1966).]

Oral hormonal activity of the pest management and control chemicals of the present invention are defined in terms of mestranol as the standard, which has a quotient of one. The oral estrogenic activity of the pest management chemical per se is lower than the standard, but at the same time, its oral anti-fertility activity is higher than that of the standard.

The pest management chemicals for this invention possess a characteristic marked separation in the above mentioned activities. Racemic-cis bisdehydrodoisynolic acid, for example, is only 50 percent as active as mestranol in the oral-estrogenic assay, but eleven times more active in the oral anti-fertility assay. This gives a 22-fold separation between anti-fertility and estrogenic activity. The racemic-cis bis-dehydrodoisynolic acid fluoride is less than one-tenth as active as mestranol as an oral-estrogenic agent, but nevertheless, it is four times more active as an anti-fertility agent. This gives a separation between anti-fertility and estrogenic activity of over forty fold. In addition, the racemic - cis 1 - ethyl - 2 - methyl - 7 - methoxy - 1,2,3,4 - tetrahydro - 2 - methylol - phenanthrene shows a forty fold separation of activities.

Chemicals are available which are both better estrogenic and better anti-fertility agents than the standard mestranol but are not effective in the control and management of pest populations. Notable among such chemicals is estradiol itself. At doses comparable to mestranol, estradiol is three times more active than mestranol as an oral-estrogenic agent and one and one-half times as active as an anti-fertility agent. However, the quotient in the specific case of estradiol is one-half, e.g.

$$\frac{\text{anti-fertility}}{\text{estrogenic}} = \frac{1.5}{3.0}$$

Even though the compounds employed in the present invention are less active than mestranol in the oral-estrogenic assay referenced hereinabove, they are extremely effective for the control and management of pests due to their increased activity as anti-fertility agents. The pest management chemicals for the method and compositions of the present invention have a preferred quotient of from about 15 to about 45.

It is known that these chemicals interfere with the overall effect on fertility and that more potent estrogenic materials than mestranol will prevent ovulation in the female, but the surprising discovery has now been made that less active estrogenic materials can provide an increased overall effect if they possess an additional anti-fertility activity characteristic of the pest management chemicals. Indeed, the active daily dose of compounds of the present invention for the control of pests is much lower than that of the standard.

In practicing the present invention for an improved method of pest control, the pest management chemical is incorporated into a food complement with or without baits. The pest management chemical can, for example, be incorporated into a food complement and/or bait by any convenient manner, as for instance, by simply mixing in the case of solid materials and by dissolution or suspension in the case of liquid materials. Thus, for example, the pest control and management chemical is admixed in corn, oats, rye, wheat, bran or grass, legumes, milk, meat, fish or other nutrients, as well as mixtures thereof, or together with conventional baits, e.g. sugar, molasses, corn oil, peanut oil, peanut butter, bacon, lard, mutton, tallow, and the like, as well as mixtures thereof.

The amount of the pest management chemical, employed in the novel edible compositions of the present invention, can vary considerably. In order to control or regulate the amount of the edible composition that will be consumed by each member of a pest population at a given time, it is preferred to use as large an amount of the pest management chemical in the composition as possible without causing the composition to be objectionable to the pest. This amount, i.e. the highest concentration, will vary with the particular pest being treated and with the type of bait being used. Ordinarily, the amount of the pest management chemical varies from about 0.0001 to about 0.5 percent by weight of the novel edible composition. However, amounts above or below this range can be used, if desired, depending on such factors as the type of pest being treated. The most suitable novel edible composition will vary according to the type of pest to be treated and the conditions existing in the area occupied by the pests. One method of selecting the most advantageous food complement and bait for a particular pest and area is to set out, e.g. in food stations, several food complements, baits and combinations thereof, known to be normally consumed by the specific pest, and observe which is most readily consumed. While establishing which is preferred by the pests, it is also advantageous for optimum treatment to note the approximate daily consumption of the preferred food complement, bait or combination. In this manner, the most preferred combination and the approximate daily consumption for the pests in a particular area can be easily and reliably determined to achieve the optimum effect of the treatment. In general, it is preferable to make available to the pests that amount of the preferred combination plus the essential active ingredient, i.e. the pest management chemical, which can be expected to be consumed in one or two days. The novel compositions containing the preferred combinations of food and bait for a specific pest are then supplied, e.g. in one or several feed stations, to the burrows and habitats of the pests and are subsequently consumed by the pests in their routine feeding activities. This established amount of the novel edible composition of the present invention is then provided for a short or extended length of time of from several days to several months, depending on the specific pest and the desired extent of control in each situation. The effect of the composition on the pests will differ according to the various members of the particular pest population consuming the pest management chemical composition. Consumption of the edible composition of the present invention by the pests arrests the sexual viability of the present generation and either prevents or seriously impairs the procreation of future generations. All members of the population are effected by these chemicals, both adults and young, both males and females. In the case of adult females, an overall effect on fertility, such as prevention of ovulation and transport of the zygotes in the oviducts, leads to a decrease in the littering of newborn pests. In addition, a majority of females, whether pregnant or not, showed no visible mammae and mammary nipples which seriously impairs the development of the young. In the case of pregnant females, pregnancy is interrupted at all stages of gestation leading to interuterine death and resorption of the fetus. In addition, abortions are also a common occurrence. In the case of the adult males, the libido of the pest is decreased due to the morphological changes caused by the pest management chemical. For example, in a rat population, ninety percent of the adult males showed reproductive organs smaller than normal after consumption of the edible composition. In a similar observation, the testis in a majority of the adult male rats were considerably smaller than normal and that one or both were in the abdominal rather than scrotal position. In the case of newborn or young, the consumption of the pest management chemical impairs the normal sexual development of the pests and in some cases even causes these members to become permanently sterile. In addition, consumption of the edible compositions of the present invention causes the thus-treated pests to become more aggressive and to compete more vigorously with the untreated pests for the available food supply and to vigorously defend their territory against other pests, thereby diminishing the supply of food available to untreated pests.

The following examples serve to illustrate but are not necessarily intended to limit the scope of the present invention.

PREPARATION A

A solution of 1 g. of dl-cis 1-ethyl-2-methyl-7-methoxy-1,2,3,4-tetrahydro-2-phenanthrenecarboxylic acid in 30 ml. of anhydrous methylene chloride is allowed to react with 1 g. of N-(2-chloro-1,1,2-trifluoroethyl)-diethylamine. The reaction mixture is heated under reflux for a period of five hours. The mixture is then poured into ice water, and the product extracted with ether. The extracts are dried and evaporated to dryness to yield the dl-cis 1-ethyl-2-methyl - 7 - methoxy - 1,2,3,4 - tetrahydro - 2 - phenanthrenecarboxylic acid fluoride which is recrystallized from acetone:hexane.

In a similar manner, utilizing the above procedure dl-cis 1-ethyl-2-methyl-7n7-butoxy-1,2,3,4-tetrahydro-2-phenanthrenecarboxylic acid;
1-ethyl-2-methyl-7-methoxy-1,2,3,4-tetrahydro-2-fluorenecarboxylic acid;
dl-cis 1,2-dimethyl-1-ethyl-7-methoxy-1,2,3,4-tetrahydro-2-phenanthrenecarboxylic acid;
dl-cis 1-ethyl-2-methyl-7-methoxy-1,2,3,4,9,10,11,12-octahydro-2-phenanthrenecarboxylic acid;
dl-trans 1-ethyl-2-methyl-7-methoxy-1,2,3,4,9,10,11,12-octahydro-2-phenanthrenecarboxylic acid; and
dl-cis 1-ethyl-2-methyl-7-methoxy-1,2,3,4,9,10,11,12-octahydro-2-phenanthrenecarboxylic acid;

are converted to the corresponding acid fluorides, namely dl-cis 1-ethyl-2-methyl-7-n-butoxy-1,2,3,4-tetrahydro-2-phenanthrenecarboxylic acid fluoride;
1-ethyl-2-methyl-7-methoxy-1,2,3,4-tetrahydro-2-fluoroenecarboxylic acid fluoride;
dl-cis 1,2-dimethyl-1-ethyl-7-methoxy-1,2,3,4-tetrahydro-2-phenanthrenecarboxylic acid fluoride;
dl-cis 1-ethyl-2-methyl-7-methoxy-1,2,3,4,9,10,11,12-octahydro-2-phenanthrenecarboxylic acid fluoride;
dl-trans 1-ethyl-2-methyl-7-methoxy-1,2,3,4,9,10,11,12-octahydro-2-phenanthrenecarboxylic acid fluoride; and
dl-cis 1-ethyl-2-methyl-7-methoxy-1,2,3,4,9,10,11,12-octahydro-2-phenanthrenecarboxylic acid fluoride.

EXAMPLE 1

A mixture of 100 g. of flour is blended with 0.01 g. of 1-ethyl-2-methyl-7-methoxy-1,2,3,4-tetrahydro-2-phenanthrenecarboxylic acid in a dry blender for a period of two hours to afford a composition containing 0.01 weight percent of active material.

In a similar manner, two mixtures each containing 0.01 g. of 1-ethyl-2-methyl-7-methoxy - 1,2,3,4 - tetrahydro-2-phenanthrenecarboxylic fluoride and 1-ethyl-2-methyl-7-methoxy-1,2,3,4-tetrahydrophenanthryl - 2 - methanol, are prepared.

EXAMPLE 2

A mixture of 85 g. of cornmeal, and 15 g. of paraffin oil is blended with 0.01 g. of 1-ethyl-2-methyl-7-methoxy-1,2,3,4-tetrahydrophenanthrenecarboxylic acid in a dry blender for a period of two hours to afford a composition containing 0.01 weight percent of the active material in combination with a bait.

In a similar manner, three mixtures containing the same portions of cornmeal, 1-ethyl-2-methyl-7-methoxy-1,2,3,4-tetrahydrophenanthrenecarboxylic acid and first linseed oil, second corn oil, and third sugar are blended in a dry blender for a period of two hours to afford compositions containing 0.01 weight percent of active material.

EXAMPLE 3

A composition containing 0.01 weight percent of 1-ethyl-2-methyl-7-methoxy-1,2,3,4-tetrahydro - 2 - phenanthrenecarboxylic acid in a 50/50 mixture of chicken mash and canned salmon was made available to a population of 100–125 rats, all *Rattus norvegicus*, for a period of 100 days. Six pounds of this composition were placed into 25 separate food stations every second day for the 100 day period. Three months later, visual observation and morphological observation of the treated population were compared with those of an untreated population of an equal size. From the visual observation of the treated area, it can be seen that:

(1) There is complete absence of young rats in the treated area in contrast to untreated area which abounds with young, (2) The percent of pregnant rats from the treated area is considered smaller than from the untreated area, (3) There are no signs of recovery of population or of a comeback of rats, and (4) The treated rats are considerably more aggressive than the untreated rats.

From the morphological observation of 25 female and 25 male rats from the treated area, it can be seen that:

(1) Tests in majority of males are one or both in abdominal rather than in scrotal position, (2) Of the adult males, 90 percent showed reproductive organs which are smaller than normal, (3) The majority of females, whether they were pregnant or not, showed no visible mammae and mammary nipples, (4) In a few cases only unilateral pregnancy was observed in one horn. Opposite ovary is much larger in those cases. In some cases number of fetuses in one horn is not in normally expected proportion with the other horn, (5) In a few cases, embryos in one horn are much larger than in the other one.

EXAMPLE 4

A group of 24 mature male rats were caged with a group of 24 mature female rats for a period of 86 consecutive days to demonstrate the influence of the pest management chemical on the fertility of the female rats. The pest management chemical, dl-cis 1-ethyl-2-methyl-7-methoxy-1,2,3,4-tetrahydrophenanthrene - 2 - carboxylic acid, was administered by gavage to only the females on the days indicated. In Table 1, the influence of this specific pest management chemical on the fertility of the female rats is contrasted with the result of an untreated group of 24 adult male and 24 adult female rats for the same 86 day period.

TABLE 1

| Dose to mature female on day of treatment, mg. | Treatment, days | No. of mated females | Total No. of litters Littering | | | No. of young per female |
|---|---|---|---|---|---|---|
| | | | 1st | 2d | 3d | |
| 0 | 0 | 24 | 24 | 22 | 14 | 25 |
| 2 | 1, 2, 31, 32, 61, 62 | 10 | 0 | 0 | 0 | 0 |

Table 1 shows that dl-cis 1-ethyl-2-methyl-7-methoxy-1,2,3,4-tetrahydrophenanthrene - 2 - carboxylic acid prevented completely the littering of young when the compound is administered to only the adult females in the rat population.

In a similar manner, a group of 24 mature male rats were caged with a group of 24 mature female rats for a period of 86 days to demonstrate the influence of the pest management chemical on the fertility of the male rats. Again, the pest management chemical, dl-cis 1-ethyl-2-methyl-7-methoxy - 1,2,3,4 - tetrahydrophenanthrene-2-carboxylic acid, was administered by gavage to only the males on the days indicated. These results were compared with an untreated group of 24 adult male and 24 adult female rats for the 86 day period. Table 2 shows influence of this specific pest management chemical on the fertility of the male rats as observed on the eighty-sixth day.

TABLE 2

| Dose to mature male on day of treatment, mg. | Treatment days | No. of untreated females mated | Total No. of litters Littering 1st | 2d | 3d | No. of young per female |
|---|---|---|---|---|---|---|
| 0 | 0 | 24 | 24 | 22 | 14 | 25 |
| 2 | 1, 2, 31, 32, 61, 62 | 10 | 6 | 2 | 0 | 6 |

Table 2 shows that dl-cis 1-ethyl-2-methyl-7-methoxy-1,2,3,4 - tetrahydrophenanthrene - 2 - carboxylic acid markedly decreased the littering of young when the compound is administered to only the adult males in the rat population.

What is claimed is:

1. A method for controlling and managing pests selected from the group consisting of rodents and birds which comprises making available to said pests in their habitat an edible composition containing, as the essential active ingredient, an effective amount of a pest management chemical represented by the following formulas:

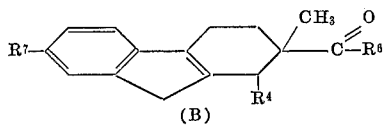
(B)

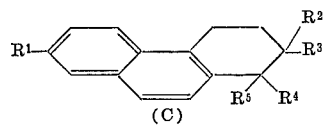
(C)

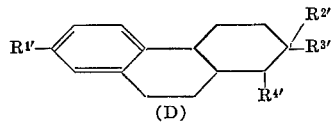
(D)

wherein,
R¹ is hydrogen, hydroxy, allyloxy, diethylaminoethoxy, lower alkoxy containing one to four carbon atoms, cyclopentyloxy, tetrahydropyran-2'-yloxy or tetrahydrofuran-2'-yloxy;
R¹' is hydrogen or methoxy;
R² is hydrogen, methyl, ethyl or n-propyl;
R²' is hydrogen or methyl;
R³ is carboxy, carboalkoxy containing two to five carbon atoms, cyano, amido, carbothiomethyl, acetyl, formyl,

acetoxymethyl, methyl or ethyl;
R³' is carboxy, formyl, methylol or

R⁴ is methyl or ethyl;
R⁵ is hydrogen, methyl or ethyl;
R⁶ is hydroxy, methoxy or fluoro; and
R⁷ is hydrogen or methyl
and a food complement, bait or a mixture of a food complement and a bait.

2. The method according to claim 1 wherein said composition contains from 0.0001 to 0.5 weight percent of said pest management chemical and said pest is a rodent.

3. The method according to claim 2 wherein the pest management chemical is represented by the following formula:

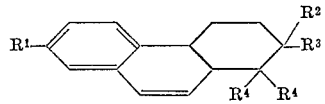

wherein,
R¹ is methoxy;
R² is methyl;
R³ is carboxy;
R⁴ is ethyl; and
R⁵ is hydrogen.

4. The method according to claim 2 wherein the pest management chemical is represented by the following formula:

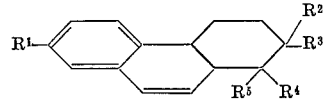

wherein,
R¹ is methoxy;
R² is methyl;
R³ is methylol;
R⁴ is ethyl; and
R⁵ is hydrogen.

5. The method according to claim 2 wherein said pest is a rat.

6. The method according to claim 2 wherein the pest management chemical is represented by the following formula:

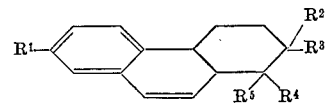

wherein,
R¹ is methoxy;
R² is methyl;
R³ is

R⁴ is ethyl; and
R⁵ is hydrogen.

References Cited

UNITED STATES PATENTS 2,621,210  12/1952  Miescher et al. ___ 260—468.5 X

OTHER REFERENCES

Mallis, Arnold: "Handbook of Pest Control," 2nd ed., 1954, p. 50.

Chem. Abstracts, Cameron et al., vol. 40, pp. 7353⁹–7354³ (1946).

ALBERT T. MEYERS, Primary Examiner

VINCENT D. TURNER, Assistant Examiner

U.S. Cl. X.R.

424—283, 285, 301, 304, 308, 324, 330, 339, 343, 356

UNITED STATES PATENT OFFICE
CERTIFICATE OF CORRECTION

Patent No. 3,476,859          Dated    November 4, 1969

Inventor(s) Ralph I. Dorfman

It is certified that error appears in the above-identified patent and that said Letters Patent are hereby corrected as shown below:

Column 3, line 14, "racemic-cis 1" should read --racemic 1--.

Column 5, line 2, "(1959)" should read --(1951)--.

Column 5, line 41, between the word "control" and "management" should appear --and--.

Column 5, line 42, between the word "activity" and "anti-fertility" should appear --as--.

Column 5, line 43, between the word "chemicals" and "the" should appear --for--.

Column 5, line 44, between the word "invention" and "a" should appear --have--.

Column 7, line 20, "7n7" should read --7-n- --.

Column 8, line 22, "Tests" should read --testis-

Column 9, line 3, cancel "un-".

Column 9, in Formula D, "$R^{4'}$" should read --$R^4$--.

Column 9, line 48, after "formyl," should appear --methylol,--.

cont.

UNITED STATES PATENT OFFICE
CERTIFICATE OF CORRECTION

Patent No. 3,476,859　　　　　　　　Dated November 4, 1969

Inventor(s) Ralph I. Dorfman

It is certified that error appears in the above-identified patent and that said Letters Patent are hereby corrected as shown below:

Column 10, in Claim 3, the formula should appear as follows:

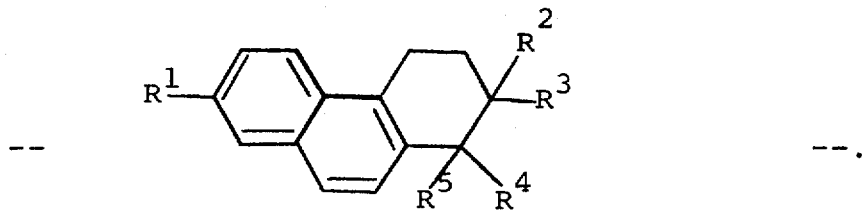

Column 10, in Claim 4, the formula should appear as follows:

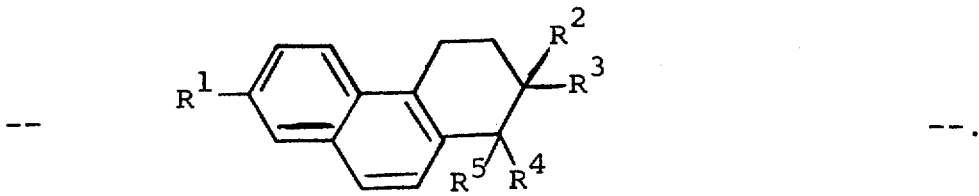

UNITED STATES PATENT OFFICE
CERTIFICATE OF CORRECTION

Patent No. 3,476,859   Dated November 4, 1969

Inventor(s) Ralph I. Dorfman

It is certified that error appears in the above-identified patent and that said Letters Patent are hereby corrected as shown below:

Column 10, in Claim 6, the formula should appear as follows:

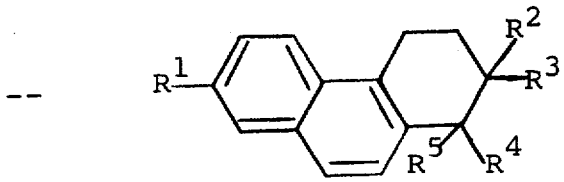

SIGNED AND SEALED
JUL 7 1970

(SEAL)
Attest:

Edward M. Fletcher, Jr.
Attesting Officer

WILLIAM E. SCHUYLER, JR.
Commissioner of Patents